United States Patent [19]

Ra

[11] Patent Number: 5,671,203
[45] Date of Patent: Sep. 23, 1997

[54] SIGNAL RECORDING LAYER RECOGNITION METHOD IN DIGITAL DISK AND APPARATUS THEREOF

[75] Inventor: Jun-ho Ra, Ansan-city, Rep. of Korea

[73] Assignee: Samsung Electronics Co., Ltd., Kyungki-Do, Rep. of Korea

[21] Appl. No.: 630,533

[22] Filed: Apr. 10, 1996

[30] Foreign Application Priority Data

Apr. 10, 1995 [KR] Rep. of Korea .................. 95-8292

[51] Int. Cl.$^6$ .................................................. G11B 7/00
[52] U.S. Cl. ...................... 369/58; 369/112; 369/44.27
[58] Field of Search .............................. 369/112, 44.25, 369/94, 44.27, 124, 58

[56] References Cited

U.S. PATENT DOCUMENTS 5,263,011 11/1993 Maeda et al. ..................... 369/116
5,408,453 4/1995 Holtslag et al. .................... 369/112

Primary Examiner—Nabil Hindi
Attorney, Agent, or Firm—Sughrue, Mion, Zinn, Macpeak and Seas.

[57] ABSTRACT

A digital disk player recognizes a signal recording layer in a loaded disk, which includes a pickup for converting an optical signal read from the loaded digital disk into an electrical signal, a converter for converting the electrical signal output from the pickup into an electrical pulse signal of which the number of pulses varies according to the number of the signal recording layers in the loaded disk, and a controller for controlling an initial focusing operation of the pickup based on a position corresponding to focus position and determining whether the signal recording layer of the loaded disk is a multilayer or a single layer recording layer based on the number of the pulses contained in the electrical pulse signal input to the converter. The controller controls a display such as a digitron to display the number of the layers which corresponds to the number of the pulses.

16 Claims, 5 Drawing Sheets

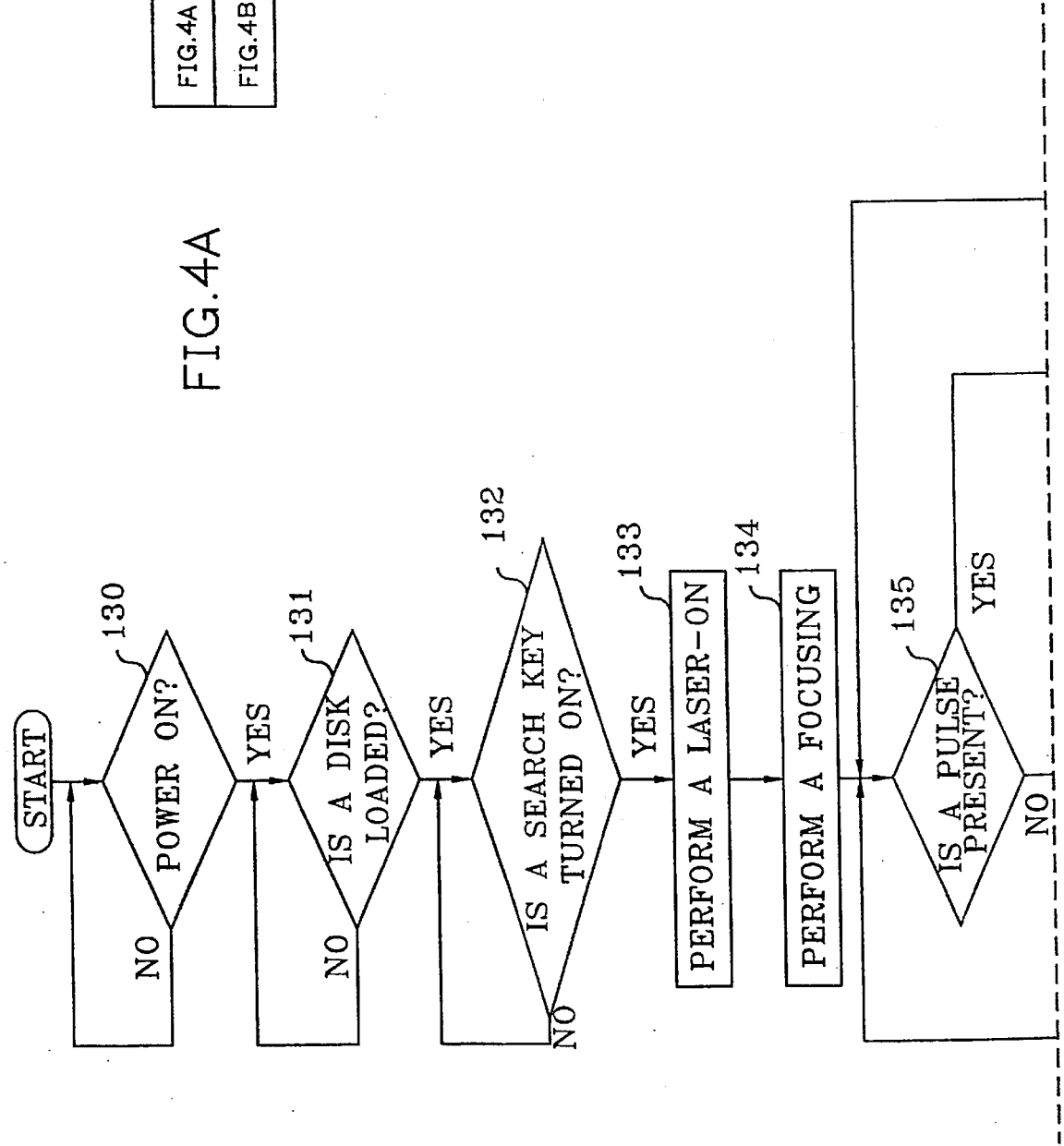

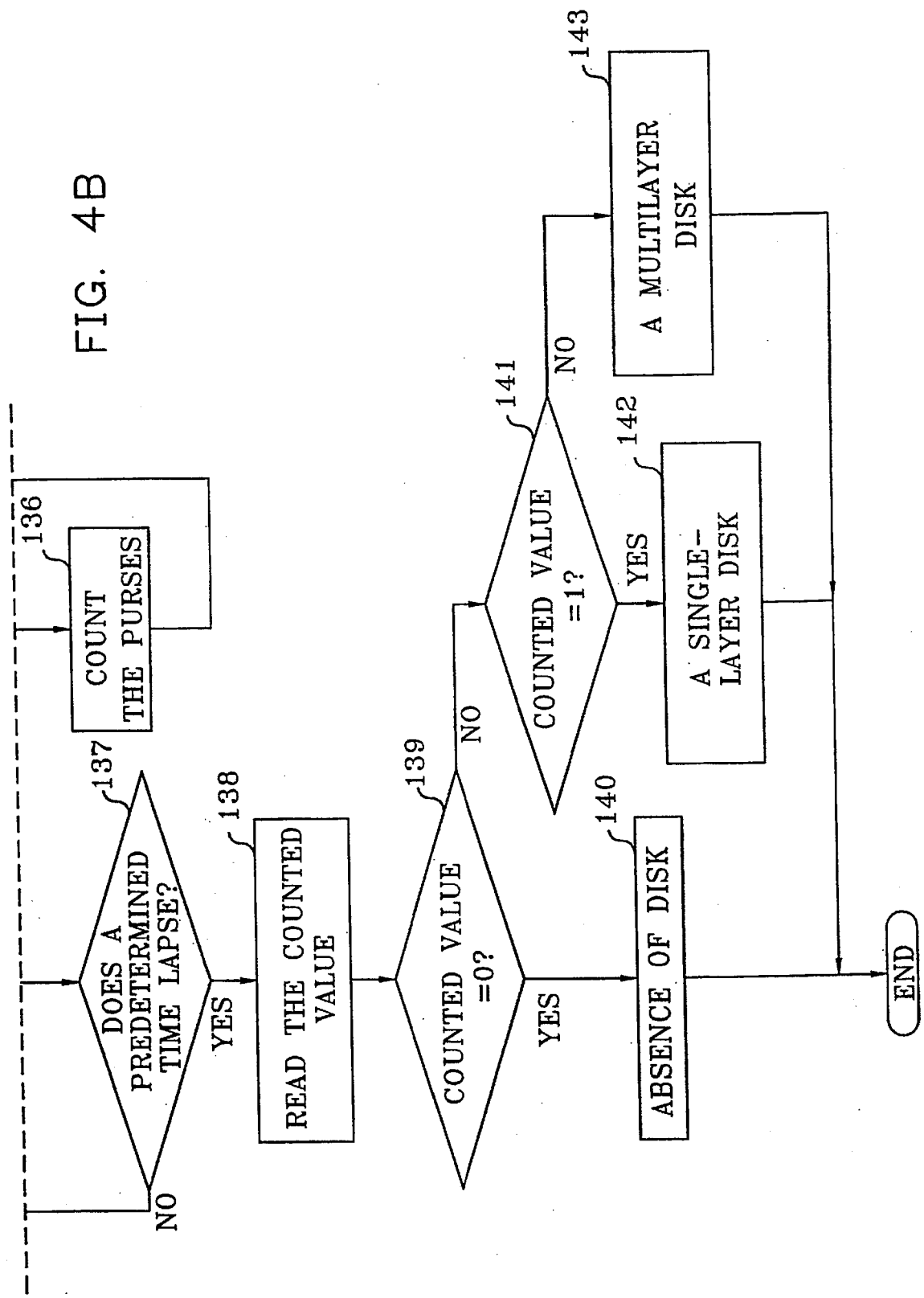

SIGNAL RECORDING LAYER RECOGNITION METHOD IN DIGITAL DISK AND APPARATUS THEREOF

BACKGROUND OF THE INVENTION

The present invention relates to a signal recording layer recognition method and apparatus for disk recognition in a digital disk player.

Referring to FIG. 1, a general disk load recognition method for a digital disk player will be described below. The digital disk player controls a focus system to check whether a disk is loaded, and the focus system irradiates laser light to a position where the disk is loaded (step 101). The focus system uses light reflected from the disk to perform a focusing operation for a predetermined interval of time in order to determine a focus position of a pickup on a signal recording surface of the disk (steps 102 and 105). If it is judged that the pickup is focused before the predetermined interval of time lapses, the disk player judges that the disk has been loaded (step 104). Meanwhile, if the focusing operation does not finish before the predetermined interval of time lapses in step 105, the disk player judges that there is no disk loaded in the disk player (step 106).

The above-described conventional disk recognition method determines whether a disk is loaded based on the presence and absence of the light signal reflected from the disk. Therefore, when loading a disk having a multilayer structure where signals are recorded on a plurality of layers, the conventional disk player does not detect the loading of the disk.

SUMMARY OF THE INVENTION

To solve the above problem, it is an object of the present invention to provide a method for recognizing a signal recording layer of a disk loaded in a digital disk player on the basis of an optical signal reflected from the disk.

It is another object of the present invention to provide a digital disk player capable of recognizing a signal recording layer in a disk loaded therein.

To accomplish the above object of the present invention, there is provided a method of recognizing a signal recording layer in a disk loaded in a digital disk player wherein said digital disk player is capable of using disks with one or more recording layers, the signal recording layer recognition method comprising the steps of:

a) performing an initial focusing operation of a pickup on the basis of a position corresponding to a focus position;

b) converting an optical signal transmitted via the pickup in step a) into an electrical pulse signal, wherein the number of pulses varies according to the number of signal recording layers in the loaded disk;

c) counting the number of the pulses in the electrical pulse signal and generating a counted value; and d) determining whether the loaded disk has a multilayer or a single layer for recording based on the number on of pulses contained in the electric pulse signal.

To accomplish the other object of the present invention, there is also provided a digital disk player comprising:

a pickup for converting an optical signal read from a loaded digital disk into an electrical signal;

conversion means for converting the electrical signal output from the pickup into an electrical pulse signal, wherein the number of pulses varies according to the number of the signal recording layers in the loaded disk; and control means for controlling an initial focusing operation of the pickup based on a predetermined position of a focus position and recognizing whether the signal recording layer of the loaded disk is a multilayer or a single layer based on the number of the pulses contained in the electric pulse signal of the conversion means.

BRIEF DESCRIPTION OF THE DRAWINGS

The preferred embodiments of the present invention are described with reference to the drawings wherein:

FIGS. 4A and 4B are flowchart diagrams for explaining a recording layer recognition method of a disk according to the present invention.

DETAILED DESCRIPTION OF THE PREFERRED EMBODIMENT

A preferred embodiment of the present invention will be described below in more detail with reference to the accompanying drawings FIGS. 2 through 4.

Figure 1:
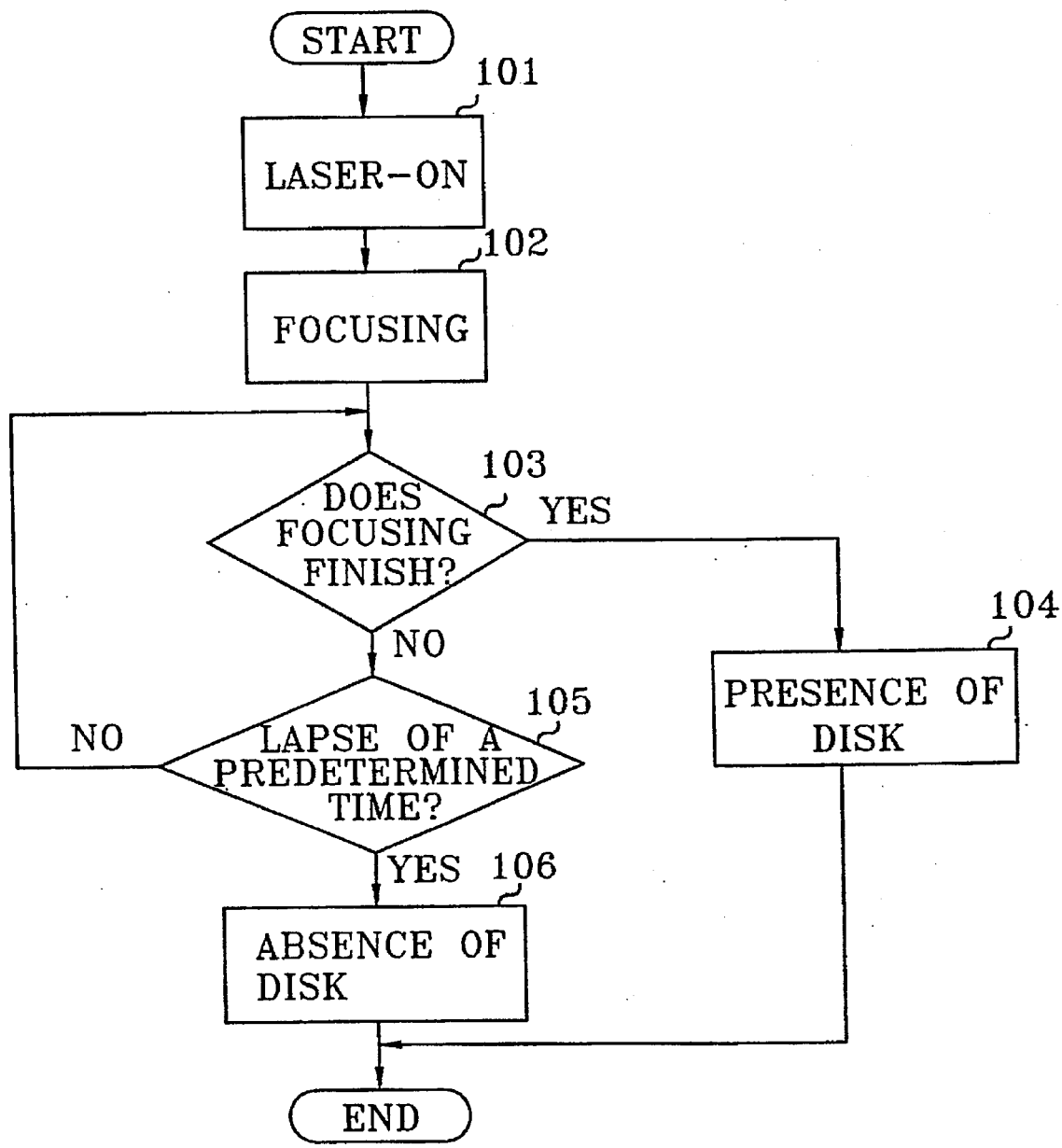
FIG. 1 is a flowchart diagram for explaining a general disk recognition method.
Figure 2:
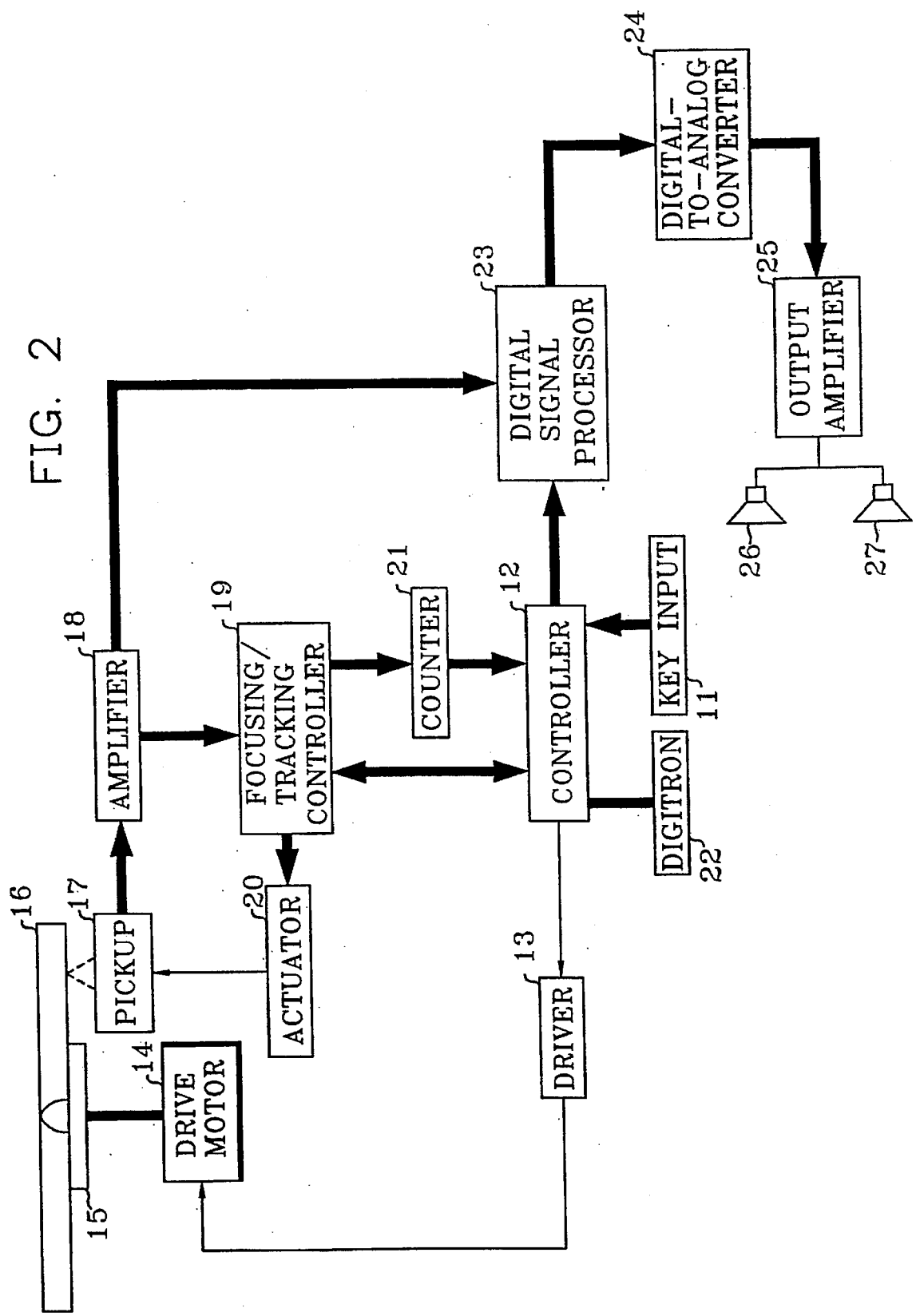
FIG. 2 is a block diagram of a digital disk player according to a preferred embodiment of the present invention.

In FIG. 2, a key input portion 11 includes instruction keys for user control of the digital disk player. A controller 12 controls a general operation of each block constituting the disk player according to user instructions input via the key input portion 11. A driver 13 controls a drive motor 14 under the control of the controller 12. The drive motor 14 rotates a turntable 15 on which a disk 16 is placed. The disk 16 rotates together with the turntable 15. A pickup 17 projects light toward the disk 16, converts the light reflected from the disk 16 into an electrical signal and transmits the electrical signal to an amplifier 18. The output of the amplifier 18 is supplied to both a focusing/tracking controller 19 and a digital signal processor 23. The focusing/tracking controller 19 outputs a signal applied from the amplifier 18 for both the controller 12 and a counter 21, and generates a control signal for controlling a focusing/tracking operation of the pickup 17 under control of the controller 12. An actuator 20 moves the pickup 17 to a tracking direction or a focusing direction according to the control signal output from the focusing/tracking controller 19. The counter 21 counts the number of the pulses of the signal supplied from the focusing/tracking controller 19. The controller 12 determines whether the disk 16 is loaded on the turntable 15 based on the counted value of the counter 21 and determines how many signal recording layers there are in the disk 16. The recording layer number information representing the number of the recording layers of the disk discriminated by the controller 12 is displayed via a digitron 22. The digital signal processor 23 processes the signal supplied from the amplifier 18 under control of the controller 12, and outputs the resultant signal to a digital-to-analog converter 24. The output of the digital-to-analog converter 24 is amplified in an output amplifier 25 and then is converted into an audible signal via speakers 26 and 27.

Figure 3A:
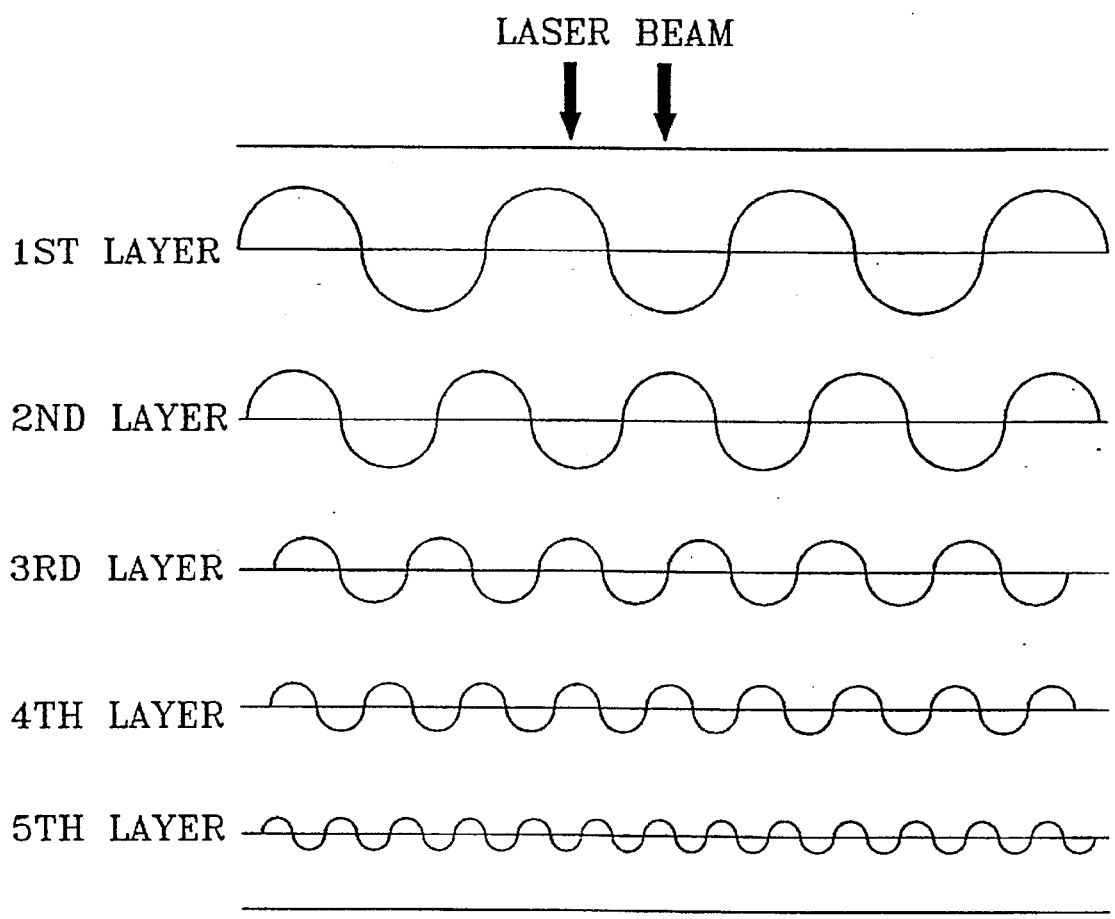
FIGS. 3A and 3B are views for explaining a signal read from a disk having a multilayer structure.
Figure 3B:
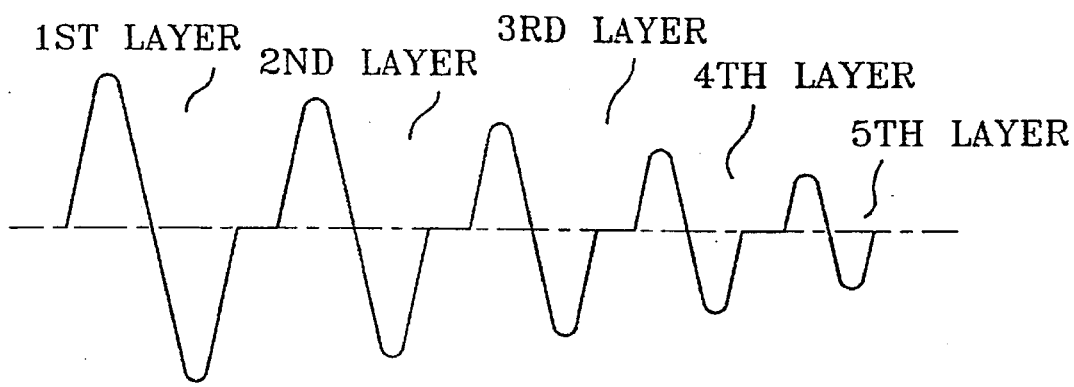

In the case where disk 16 has five layers, for example, the magnitude of a signal corresponding to each layer is shown in FIG. 3A where the magnitude has been exaggerated for illustrative purposes. In FIG. 3A, a first layer is the closest layer to the pickup 17 and a fifth layer is the farthest layer from the pickup 17. FIG. 3B shows that a signal reflected from each of the layers in the disk 16 has a different magnitude according to a distance between the pickup 17 and the respective layers in the disk 16. As can be seen from FIG. 3B, the electrical signal corresponding to the first layer has a magnitude larger than that of the fifth layer.

Referring to FIG. 4, the disk layer recognition method according to the present invention, which uses variation of the magnitude of the signal due to the difference of the distance between the signal recording layers in the disk 16 and the pickup 17, will be described below.

Steps 130, 131 and 132 in FIG. 4 are performed by user manipulation. A user turns on the power of the FIG. 2 apparatus (step 130), loads the disk 16 into the apparatus (step 131), and turns on a search key (not shown) in the key input portion 11 to search a layer structure of the loaded disk (step 132). Since the steps 130, 131 and 132 may be selected by a design condition of the FIG. 2 apparatus, it is apparent to a person of ordinary skill in the art that a system designer can design the FIG. 2 apparatus so that a layer structure of the disk is automatically searched when the disk is loaded therein.

In step 133, the controller 12 performs a "laser-on" control operation which enables the pickup 17 to project a laser beam. When the control of the "laser-on" is performed, the driver 13 does not control rotation operation of the drive motor 14. Therefore, the disk does not rotate in this case. Meanwhile, the focusing/tracking controller 19 controls the actuator 20 to enable the pickup 17 to project the laser beam toward the disk 16. The controller 12 controls the focusing/tracking controller 19 so that the pickup 17 is moved to a focus position in step 134. More particularly, the controller 12 controls the focusing/tracking controller 19 to accomplish a focus adapted in a single-layer disk in step 134. Thus, when the disk is loaded on the turntable 15, the pickup 17 brings into focus a particular layer of the disk 16, for example, the first layer of FIG. 3A. Thereafter, the light signal reflected from the disk 16 and returned to the pickup 17 is converted into an electrical signal by the pickup 17. The electrical signal is amplified by the amplifier 18. The amplifier 18 amplifies the electrical signal output from the pickup 17 to distinguish definitely the recording layers in the disk 16. Therefore, the output signal of the amplifier 18 has a pulse pattern similar to that shown in FIG. 3B. The reason why the magnitude of the output signal of the amplifier 18 becomes gradually smaller is due to the fact that degrees of attenuation between the optical signals incident to the pickup 17 are different from each other due to a difference of the distance between the pickup 17 and the respective signal recording layers in the disk 16. The output signal of the amplifier 18 is supplied to the focusing/tracking controller 19. The focusing/tracking controller 19 converts the output signal of the amplifier 18 into an electrical pulse signal, wherein the number of the pulses varies according to the number of the signal recording layers contained in the loaded disk 16. The amplifier 18 and the focusing/tracking controller 19 comprises a conversion unit for converting the electrical signal output from the pickup 17 into the electrical pulse signal, wherein the number of the pulses varies according to the number of the signal recording layers contained in the loaded disk 16. The output of the focus/tracking controller 19 is applied to the controller 12 and the counter 21.

The controller 12 judges whether the electrical signal, in the form of the pulse and corresponding to the optical signal reflected from the disk 16, is input from the focusing/tracking controller 19 in step 135. When there is an input of the electrical pulse signal, the counter 21 counts the number of the pulses in the electrical pulse signal supplied from the focusing/tracking controller 19 and stores the counted value in step 136. The controller 12 judges whether a predetermined interval of time lapses in step 137, and reads the counted value stored in the counter 21 when the predetermined interval of time lapses. Therefore, the pulse signals are continuously counted by the counter 21 until the predetermined interval of time lapses. For example, when an optical signal received by the pickup 17 is only once reflected from each layer in the disk 16 during a predetermined interval of time, and the disk 16 loaded onto the turntable 15 has a five-layer structure as shown in FIG. 3A, the counted value becomes five. If the counted value read from the counter 21 is zero in step 139, the controller 12 judges that no disk has been loaded onto the turntable 15 in step 140. At this time, the digitron 22 displays that no disk is loaded onto the turntable 15 under the control of the controller 12. If the counted value is one in step 141, the controller 12 recognizes in step 142 that the disk 16 loaded on the turntable 15 has a single-layer structure. Here, the controller 12 controls the digitron 22 to display that the disk 16 currently loaded on the turntable 15 has a single-layer structure. When the counted value is neither zero nor one in the step 141, the controller 12 displays the number of the recording layers of the disk 16 currently loaded on the turntable 15 via the digitron 22.

Although the counter 21 and the controller 12 are separated from each other in the apparatus described above, an actual system can be designed to use a single microprocessor to constitute the counter 21 and the controller 12. Thus, since the microprocessor used in the existing disk player includes a counter therein, a multilayer structure recognition function proposed by the present invention can be performed by modifying an internal program in the microprocessor.

The method and apparatus according to the present invention can recognize the structure of the signal recording layer in a loaded disk and the number of disk layers in a system which can use the disks of both a multilayer and single-layer structures. Since the present invention can be also performed by modifying the internal program in the microprocessor, a disk having a multilayer structure can be recognized without modifying a hardware structure in the existing disk player.

While only certain embodiments of the invention have been specifically described herein, it will apparent that numerous modifications may be made thereto without departing from the spirit and scope of the invention.

What is claimed is:

1. A method of recognizing a signal recording layer in a disk loaded in a digital disk player capable of using disks with one recording layer and disks with multiple recording layers, said signal recording layer recognition method comprising:

a) performing an initial focusing operation of a pickup by transmitting a laser from said pickup, said focusing operation determined on the basis of a position corresponding to a focus position;

b) converting an optical signal transmitted via the pickup in step a) into an electrical pulse signal, said pulse signal having a number of pulses in a predetermined interval of time according to the number of the signal recording layers of a disk loaded in said digital disk player;

c) counting the number of pulses in the electrical pulse signal in said predetermined interval of time and generating a counted value; and d) determining whether the loaded disk has a multiple or a single recording layer structure based on said counted value.

2. The signal recording layer recognition method for a digital disk according to claim 1, wherein in said step a) the initial focusing operation of said pickup is performed on the basis of a position corresponding to a focus in a disk having a single-layer recording structure.

3. The signal recording layer recognition method for a digital disk according to claim 1, wherein said step a) further comprises the step of preventing the loaded disk from being rotated during the initial focusing operation of said pickup.

4. The signal recording layer recognition method for a digital disk according to claim 1, wherein in said step d) the number of the layers of the loaded disk equals the counted value.

5. A digital disk player comprising:

a pickup for converting an optical signal read from a loaded digital disk during an initial focusing operation into an electrical signal;

conversion means for converting the electrical signal output from said pickup into an electrical pulse signal, said pulse signal having a number of pulses in a predetermined interval of time according to the number of the signal recording layers in the loaded disk; and control means for controlling said initial focusing operation of said pickup based on a position corresponding to a focus position and for determining whether the signal recording layer of the loaded disk is a multilayer or a single layer based on the number of the pulses contained in the electrical pulse signal in said predetermined interval of time output by said conversion means.

6. The digital disk player according to claim 5, wherein said control means controls the initial focusing operation of said pickup on the basis of a position of the focus in a disk having a single-layer recording structure.

7. The digital disk player according to claim 6, wherein said control means prevents the loaded disk from rotating during the initial focusing operation of said pickup.

8. The digital disk player according to claim 5, wherein said control means determines that the number of recording layers of the loaded disk equals the number of pulses.

9. The digital disk player according to claim 8, further comprising a display means for displaying the number of recording layers in the loaded disk and wherein said control means controls said display means to display the number of recording layers in the loaded disk.

10. The signal recording layer recognition method according to claim 1 wherein in said step b), said electrical pulse signal is obtained from said optical signal based on a signal level recorded on each respective layer of the loaded disk.

11. The digital disk player according to claim 5 wherein said pickup reads said optical signal based on a signal level recorded on each respective layer of the loaded disk and wherein said conversion means obtains said electrical pulse signal based on said recorded signal levels.

12. The signal recording layer recognition method according to claim 10, wherein said step a) further comprises the step of preventing the loaded disk from being rotated during the initial focusing operation of said pickup.

13. The signal recording layer recognition method according to claim 10 wherein in said step d) the number of the layers of the loaded disk equals the counted value.

14. The digital disk player according to claim 11, wherein said control means prevents the loaded disk from rotating during the initial focusing operation of said pickup.

15. The digital disk player according to claim 11, wherein said control means determines that the number of recording layers of the loaded disk equals the number of pulses.

16. The digital disk player according to claim 15, further comprising a display means for displaying the number of recording layers in the loaded disk and wherein said control means controls said display means to display the number of recording layers in the loaded disk.

* * * * *